United States Patent
Urabe et al.

(10) Patent No.: US 10,675,962 B2
(45) Date of Patent: Jun. 9, 2020

(54) HYBRID VEHICLE DRIVING SYSTEM

(71) Applicant: HONDA MOTOR CO., LTD., Tokyo (JP)

(72) Inventors: Eiichirou Urabe, Wako (JP); Hiroshi Takei, Wako (JP); Takashi Fukuda, Wako (JP); Hidetoshi Katou, Wako (JP); Hitoshi Saika, Wako (JP); Tsukasa Aiba, Wako (JP); Takahiro Hagimoto, Wako (JP); Jun Masuda, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 237 days.

(21) Appl. No.: 15/546,360

(22) PCT Filed: Jan. 28, 2015

(86) PCT No.: PCT/JP2015/052372
§ 371 (c)(1),
(2) Date: Jul. 26, 2017

(87) PCT Pub. No.: WO2016/121032
PCT Pub. Date: Aug. 4, 2016

(65) Prior Publication Data
US 2018/0022202 A1    Jan. 25, 2018

(51) Int. Cl.
*B60K 6/405* (2007.10)
*B60K 6/40* (2007.10)
(Continued)

(52) U.S. Cl.
CPC ............... *B60K 6/405* (2013.01); *B60K 1/02* (2013.01); *B60K 6/40* (2013.01); *B60K 6/442* (2013.01);
(Continued)

(58) Field of Classification Search
CPC .......... B60K 6/40; B60K 6/405; B60K 6/442; H02K 5/16; H02K 5/22; H02K 11/00
See application file for complete search history.

(56) References Cited

U.S. PATENT DOCUMENTS 5,914,575 A * 6/1999 Sasaki ..................... B60L 50/61
318/150
6,087,734 A * 7/2000 Maeda .................... B60L 50/16
290/40 C (Continued)

FOREIGN PATENT DOCUMENTS

CN        1703334 A    11/2005
CN      102007011 A     4/2011
(Continued)

OTHER PUBLICATIONS

Office Action dated Nov. 20, 2018, issued in counterpart Chinese Application No. 201580073168.8, with English translation. (11 pages).

(Continued)

*Primary Examiner* — James A Shriver, II
*Assistant Examiner* — Vaughn Coolman
(74) *Attorney, Agent, or Firm* — Westerman, Hattori, Daniels & Adrian, LLP

(57) ABSTRACT

A hybrid vehicle driving system includes: a generator; a motor; a case which accommodates the generator and the motor; and a power control unit for controlling the generator and the motor, the generator and the motor being disposed side by side on a same axis within the case. The power control unit is mounted on the case by connecting a unit-side generator connector and a unit-side motor connector which are provided on a bottom surface of the power control unit with a case-side generator connector and a case-side motor connector which are disposed on the case, directly and respectively. The case is fixed to a vehicle framework (Continued)

member via a mount member, and a fixing point where the case and the mount member are fixed together is disposed near the case-side generator connector and the case-side motor connector.

15 Claims, 14 Drawing Sheets

(51) Int. Cl.
| | |
|---|---|
| *H02K 11/33* | (2016.01) |
| *B60K 1/02* | (2006.01) |
| *H02K 7/00* | (2006.01) |
| *B60K 13/04* | (2006.01) |
| *H02K 7/116* | (2006.01) |
| *H02K 5/24* | (2006.01) |
| *B60K 6/442* | (2007.10) |
| *H02K 5/22* | (2006.01) |
| *B60K 6/485* | (2007.10) |

(52) U.S. Cl.
CPC .............. *B60K 6/485* (2013.01); *B60K 13/04* (2013.01); *H02K 5/225* (2013.01); *H02K 5/24* (2013.01); *H02K 7/006* (2013.01); *H02K 11/33* (2016.01); *B60Y 2304/03* (2013.01); *B60Y 2304/05* (2013.01); *B60Y 2306/09* (2013.01); *H02K 7/116* (2013.01); *Y10S 903/951* (2013.01); *Y10S 903/952* (2013.01)

(56) References Cited

U.S. PATENT DOCUMENTS

| | | | | |
|---|---|---|---|---|
| 6,166,498 | A * | 12/2000 | Yamaguchi | B60L 50/16 318/34 |
| 6,323,613 | B1 * | 11/2001 | Hara | H02K 11/33 318/471 |
| 6,833,641 | B2 * | 12/2004 | Uchida | B60K 6/26 310/54 |
| 7,150,631 | B2 * | 12/2006 | Reed | H01R 4/307 439/34 |
| 7,211,912 | B2 * | 5/2007 | Takenaka | B60L 50/61 310/54 |
| 7,402,923 | B2 * | 7/2008 | Klemen | B60K 6/365 180/339 |
| 7,847,450 | B2 * | 12/2010 | Kakuda | B60K 6/405 310/89 |
| 7,965,510 | B2 * | 6/2011 | Suzuki | B60K 6/365 361/699 |
| 8,026,642 | B2 * | 9/2011 | Hotta | B60K 1/00 310/52 |
| 8,643,235 | B2 * | 2/2014 | Omiya | B60K 6/445 310/64 |
| 8,875,825 | B2 * | 11/2014 | Asakura | B60K 6/405 180/68.4 |
| 9,214,848 | B2 * | 12/2015 | Yamaguchi | H02K 11/225 |
| 9,446,657 | B2 * | 9/2016 | Takahashi | B60L 15/007 |
| 9,623,756 | B2 * | 4/2017 | Suzuki | B60L 53/16 |
| 9,681,571 | B2 * | 6/2017 | Hansen | H05K 7/1432 |
| 2004/0124722 | A1 * | 7/2004 | Uchida | B60K 6/26 310/54 |
| 2005/0006963 | A1 * | 1/2005 | Takenaka | B60K 1/00 310/52 |
| 2005/0037883 | A1 | 2/2005 | Motoike et al. | |
| 2005/0208782 | A1 * | 9/2005 | Reed | H01R 4/307 439/34 |
| 2005/0253465 | A1 * | 11/2005 | Takenaka | H02K 5/20 310/52 |
| 2007/0145747 | A1 | 6/2007 | Motoike et al. | |
| 2008/0169712 | A1 * | 7/2008 | Koyama | G01D 5/2013 310/71 |
| 2009/0256437 | A1 * | 10/2009 | Miura | H02K 5/225 310/71 |
| 2010/0097765 | A1 * | 4/2010 | Suzuki | B60K 6/365 361/699 |
| 2010/0175933 | A1 * | 7/2010 | Yoshida | B60K 6/26 180/65.1 |
| 2010/0283337 | A1 * | 11/2010 | Omiya | H02K 11/30 310/64 |
| 2011/0036652 | A1 | 2/2011 | Honda et al. | |
| 2013/0241282 | A1 * | 9/2013 | Ikeno | B60R 16/0215 307/10.1 |
| 2014/0084719 | A1 | 3/2014 | Asakura et al. | |
| 2015/0022064 | A1 | 1/2015 | Yamaguchi et al. | |
| 2016/0039276 | A1 * | 2/2016 | Takahashi | B60L 15/007 180/65.21 |

FOREIGN PATENT DOCUMENTS

| | | |
|---|---|---|
| CN | 104290590 A | 1/2015 |
| JP | 2004-284447 A | 10/2004 |
| JP | 2005-224008 A | 8/2005 |
| JP | 2007-89285 A | 4/2007 |
| JP | 2008-253025 A | 10/2008 |
| JP | 2010-861 A | 1/2010 |
| JP | 2010-247786 A | 11/2010 |
| JP | 2011-63147 A | 3/2011 |
| JP | 2011-84198 A | 4/2011 |
| JP | 2011-130576 A | 6/2011 |
| JP | 2011-134654 A | 7/2011 |
| JP | 2012-65436 A | 3/2012 |
| JP | 2012-170177 A | 9/2012 |
| JP | 2013-150472 A | 8/2013 |
| JP | 2013-224071 A | 10/2013 |

OTHER PUBLICATIONS

International Preliminary Report on Patentability (Form PCT/IPEA/409) issued in counterpart International Application No. PCT/JP2015/052372 dated Dec. 5, 2016, with English translation. (24 pages).
Written Opinion of the International Searching Authority (Form PCT/ISA/237) dated May 12, 2015, issued in counterpart International Application No. PCT/JP2015/052372 (5 pages).
International Search Report dated May 12, 2015, issued in counterpart International Application No. PCT/JP2015/052372 with English Translation (4 pages).

* cited by examiner

HYBRID VEHICLE DRIVING SYSTEM

TECHNICAL FIELD

The present invention relates to a hybrid vehicle driving system and more particularly to a hybrid vehicle driving system which includes an engine, a generator and a motor.

BACKGROUND ART

Conventionally, in a hybrid vehicle driving system including an engine, a generator and a motor, there is provided a power control unit (PCU) as a power controlling apparatus for controlling the generator and the electric motor.

The power control unit is made up of a generator inverter which is connected between a battery and the generator to convert an alternating current voltage into a direct current voltage, a motor inverter which is connected between the battery and the motor to convert a direct current voltage into an alternating current voltage or an alternating current voltage into a direct current voltage, and a control unit (ECU) for controlling the generator inverter and the motor inverter.

In the conventional hybrid vehicle driving system, a case where the generator and the motor are accommodated and the power control unit are mounted separately on a vehicle framework member. The power control unit is connected to the generator and the motor by way of a three-phase cable. This not only requires a mounting frame for the power control unit but also causes fears that noise is generated from the three-phase cable.

Then, as described in Patent Literatures 1, 2 it is proposed that the power control unit is mounted directly on the case. According to these hybrid vehicle drive systems, since the mounting frame for the power control unit and the three-phase cable are not required, there is provided such an advantage that not only a vehicle body weight and cost can be reduced but also the generation of noise can be suppressed.

PRIOR ART LITERATURE

Patent Literature

Patent Literature 1: JP-A-2013-150472
Patent Literature 2: JP-A-2012-170177

SUMMARY OF THE INVENTION

Problem that the Invention is to Solve

However, since the power control unit is heavy, if the power control unit is mounted directly on the case, the position of a center of gravity of the case becomes high, resulting in fears that the vibration of the case is increased. Then, when the vibration of the case is increased, there are caused fears that contact failures of connectors are generated and that noise transmitted to an interior of a passenger compartment of a hybrid vehicle is increased.

In addition, if the power control unit is mounded directly on the case, how to dispose a case-side connector and a unit-side connector still has to be studied.

Further, if the engine, the generator and the motor are disposed adjacent to one another, how to dispose the power control unit relative to an exhaust pipe of the engine which constitutes a heat source still has to be studied.

The invention has been made in view of the problems described above, and an object thereof is to provide a hybrid vehicle driving system which enables a power control unit to be mounted preferably on a case which accommodates a generator and a motor.

Means for Solving the Problem

With a view to achieving the object, the invention provides the following aspects. According to a first aspect of the invention, there is provided a hybrid vehicle driving system (e.g., a hybrid vehicle driving system 100 in an embodiment which will be described later) including:

a generator (e.g., a generator 20 in the embodiment) which can generate electric power using power of an engine (e.g., an engine 4 in the embodiment);

a motor (e.g., a motor 30 in the embodiment) which is driven by electric power to drive wheels;

a case (e.g., a driving system case 40 in the embodiment) which accommodates the generator and the motor; and a power control unit (e.g., a power control unit 60 in the embodiment) for controlling the generator and the motor, the generator and the motor being disposed side by side on a same axis within the case, wherein the power control unit is mounted on the case by connecting a unit-side generator connector e.g., a unit-side generator connector 61 in the embodiment) and a unit-side motor connector (e.g., a unit-side motor connector 62 in the embodiment) which are provided on a bottom surface of the power control unit with a case-side generator connector (e.g., a case-side generator connector 51 in the embodiment) and a case-side motor connector (e.g., a case-side motor connector 52 in the embodiment) which are disposed on the case, directly and respectively, wherein the case is fixed to a vehicle framework member (e.g., a body frame 80 in the embodiment) via a mount member (e.g., a mount member 70 in the embodiment), and wherein a fixing point (e.g., a first fixing point K2 in the embodiment) where the case and the mount member are fixed together is disposed near the case-side generator connector and the case-side motor connector.

According to a second aspect of the invention, in the hybrid vehicle driving system according to the first aspect, a distance (e.g., a distance L1 in the embodiment) from the fixing point to the case-side generator connector and the case-side motor connector is shorter than a distance (e.g., a distance L2 in the embodiment) from the fixing point to a body-side fixing point (e.g., a body-side fixing point K1 in the embodiment) where the mount member and the vehicle framework member are fixed together.

According to a third aspect of the invention, in the hybrid vehicle driving system according to the first aspect or the second aspect, when looking at the fixing point from a direction which is at right angles to a direction in which the case-side generator connector and the case-side motor connector are aligned, the fixing point is situated between an inner end portion (e.g., an inner end portion 51e in the embodiment) of the case-side generator connector and an inner end portion (e.g., an inner end portion 52e in the embodiment) of the case-side motor connector.

According to a fourth aspect of the invention, in the hybrid vehicle driving system according to any one of the first to third aspects, the fixing point includes a first fixing point (e.g., a first fixing point K2 in the embodiment) which is situated between an inner end portion of the case-side generator connector and an inner end portion of the case-side motor connector, and further a second fixing point (e.g., a second fixing point K3 in the embodiment) and a third fixing point (e.g., a third fixing point K4 in the embodiment) which differ from the first fixing point, and when looking at the second fixing point and the third fixing point from a direction which is at right angles to a direction in which the case-side generator connector and the case-side motor connector are aligned, the second fixing point and the third fixing point are situated between an outer end portion (e.g., an outer end portion 51f in the embodiment) of the case-side generator connector and an outer end portion (e.g., an outer end portion 52f in the embodiment) of the case-side motor connector.

According to a fifth aspect of the invention, in the hybrid vehicle driving system according to any one of the first to fourth aspects, the power control unit and the case are fastened together with bolts, and at least four bolt fastening points (e.g., bolt fastening points T5, T6, T7, T8 in the embodiment) where the power control unit and the case are fastened together are provided so as to surround the case-side generator connector and the case-side motor connector in such a way as to form a rectangular shape therearound.

According to a sixth aspect of the invention, in the hybrid vehicle driving system according to any one of the first to fifth aspects, the case-side generator connector and the case-side motor connector are fixed to the case by a connector holding member (e.g., a connector holding member 53 in the embodiment), the power control unit is fixed to the connector holding member, and a fixing point (e.g., a fixing point K5 in the embodiment) where the power control unit and the connector holding member are fixed together is disposed near the fixing point where the case and the mount member are fixed together.

According to a seventh aspect of the invention, in the hybrid vehicle driving system according to the sixth aspect, the connector holding member and the case are fastened together with a bolt, and when looking at a bolt fastening point (e.g., bolt fastening points T1, T2 in the embodiment) where the connector holding member and the case are fastened together with the bolt from a direction in which the case-side generator connector and the case-side motor connector are aligned, the bolt fastening point is situated between the fixing portion where the power control unit and the connector holding member are fixed together and the fixing point where the case and the mount member are fixed together.

According to an eighth aspect of the invention, in the hybrid vehicle driving system according to any one of the first to seventh aspects, in an axial direction and a direction which is at right to the axial direction, lengths (e.g., lengths L11, L12 in the embodiment) of the power control unit are shorter than lengths (e.g., lengths 21, 22 in the embodiment) of the case.

According to a ninth aspect of the invention, in the hybrid vehicle driving system according to any one of the first to eighth aspects, the generator and the motor which are disposed side by side in the case are disposed within an engine compartment together with the engine, and in a state where the case is fixed to the vehicle framework member via the mount member, the power control unit is disposed such that an upper surface of the power control unit is inclined upwards from a front towards a rear thereof so as to follow a shape of a hood which covers the engine compartment.

According to a tenth aspect of the invention, in the hybrid vehicle driving system according to the ninth aspect, the power control unit has a water jacket, and the water jacket communicates with an air bleeding tank (e.g., an air bleeding tank 69 in the embodiment) which is provided rearwards.

According to an eleventh aspect of the invention, in the hybrid vehicle according to any one of the first to tenth aspects, the power control unit is rested on a power control unit resting portion (e.g., a power control unit resting portion 42k in the embodiment) which is provided on an upper surface of the case with a space defined therebetween, and a recessed portion (e.g., a recessed portion 42m in the embodiment) is formed on the case so as to be adjacent to the power control unit resting portion.

According to a twelfth aspect of the invention, there is provided a hybrid vehicle driving system (e.g., the hybrid vehicle driving system 100 in the embodiment) including:

a generator (e.g., the generator 20 in the embodiment) which can generate electric power using power of an engine (e.g., the engine 4 in the embodiment);

a motor (e.g., the motor 30 in the embodiment) which is driven by electric power to drive wheels;

a case (e.g., the driving system case 40 in the embodiment) which accommodates the generator and the motor; and a power control unit (e.g., the power control unit 60 in the embodiment) for controlling the generator and the motor, the generator and the motor being disposed side by side on a same axis within the case, wherein the power control unit is mounted on the case by connecting a unit-side generator connector (e.g., the unit-side generator connector 61 in the embodiment) and a unit-side motor connector (e.g., the unit-side motor connector 62 in the embodiment) which are provided on a bottom surface of the power control unit with a case-side generator connector (e.g., the case-side generator connector 51 in the embodiment) and a case-side motor connector (e.g., the case-side motor connector 52 in the embodiment) which are disposed on the case, directly and respectively, and wherein the case-side generator connector and the case-side motor connector are disposed side by side along a direction which is at right angles to an axial direction between a center of the generator in the axial direction and a center of the motor in the axial direction.

According to a thirteenth aspect of the invention, in the hybrid vehicle driving system according to the twelfth aspect, a generator resolver (e.g., a generator resolver 24 in the embodiment) and a motor resolver (e.g., a motor resolver 34 in the embodiment) are provided inwards of a coil transition portion e.g., a coil transition portion 23b in the embodiment) of the generator and a coil transition portion (e.g., a coil transition portion 33b in the embodiment) of the motor in a radial direction and between the generator and the motor in the axial direction, and a generator resolver stator (e.g., a resolver stator 24b in the embodiment) which makes up the generator resolver and a motor resolver stator (e.g., a resolver stator 34b in the embodiment) which makes up the motor resolver are supported on a partition wall (e.g., a partition wall 44 in the embodiment) which divides an inside of the case into a generator accommodating portion and a motor accommodating portion.

According to a fourteenth aspect of the invention, in the hybrid vehicle driving system according to the twelfth or thirteenth aspect, a generator resolver (e.g., the generator resolver 24 in the embodiment) and a motor resolver (e.g., the motor resolver 34 in the embodiment) are provided inwards of a coil transition portion (e.g., the coil transition portion 23b in the embodiment) of the generator and a coil transition portion (e.g., the coil transition portion 33b in the embodiment) of the motor in a radial direction and between the generator and the motor in the axial direction, a resolver connector (e.g., a resolver connector 35 in the embodiment) is provided on the case, and the resolver connector is provided on a surface (e.g., a front surface in the embodiment) of the case which differs from a surface thereof where the case-side generator connector and the case-side motor connector are provided.

According to a fifteenth aspect of the invention, there is provided a hybrid vehicle driving system (e.g., the hybrid vehicle driving system 100 in the embodiment) including:

an engine (e.g., the engine 4 in the embodiment);

an exhaust pipe (e.g., an exhaust pipe 4b in the embodiment) which is connected to the engine;

a generator (e.g., the generator 20 in the embodiment) which can generate electric power using power of the engine;

a motor (e.g., the motor 30 in the embodiment) which is driven by electric power to drive wheels;

a case (e.g., the driving system case 40 in the embodiment) which accommodates the generator and the motor; and a power control unit (e.g., the power control unit 60 in the embodiment) for controlling the generator and the motor, the generator and the motor being disposed side by side on a same axis within the case, wherein the engine is disposed adjacent to the case in a width direction of a vehicle, wherein the exhaust pipe extends from a front towards a rear of the vehicle while passing underneath the engine, wherein the power control unit is mounted on the case by connecting a unit-side generator connector (e.g., the unit-side generator connector 61 in the embodiment) and a unit-side motor connector (e.g., the unit-side motor connector 62 in the embodiment) which are provided on a bottom surface of the power control unit with a case-side generator connector (e.g., the case-side generator connector 51 in the embodiment) and a case-side motor connector (e.g., the case-side motor connector 52 in the embodiment) which are disposed on the case, directly and respectively, and wherein the power control unit is disposed so as to be offset in the width direction from a projection zone (e.g., an exhaust pipe projection zone H in the embodiment) where the exhaust pipe is projected in an up-down direction.

Advantages of the Invention

According to the first aspect, although vibration from the power control unit is transmitted to the inside of the passenger compartment by way of the case, the mount member and the vehicle framework member by mounting the power control unit directly on the case where the generator and the motor are accommodated via the case-side generator connector and the case-side motor connector, since the power control unit and the case make up a single rigid member and the power control unit is disposed near the fixing point where the case and the mount member are fixed together, it is possible to reduce the vibration that would be transmitted to the inside of the passenger compartment. As a result, it is possible to reduce noise that would be transmitted from the power unit to the inside of the passenger compartment. In addition, since the fixing point where the case and the mount member are fixed together is disposed near the case-side generator connector and the case-side motor connector, it is possible to obtain a great vibration damping effect ire the case-side generator connector and the case-side motor connector which lie near the fixing point, thereby making it possible to prevent a contact failure of the connectors that would otherwise be caused by vibration.

According to the second aspect, the fixing point where the case and the mount member are fixed together can be disposed near the case-side generator connector and the case-side motor connector.

According to the third aspect, the fixing point where the case and the mount member are fixed together can be disposed so as to keep a good balance against the case-side generator connector and the case-side motor connector, thereby making it possible to reduce further the vibration of the case-side generator connector and the case-side motor connector.

According to the third aspect, the three fixing points where the case and the mount member are fixed together can be disposed so as to keep a good balance against the case-side generator connector and the case-side motor connector, thereby making it possible to reduce much further the vibration of the case-side generator connector and the case-side motor connector.

According to the fifth aspect, since the rigidity of the case is enhanced by integrating the power control unit with the case through fastening them together with the bolt, it is possible to reduce more the vibration of the case.

According to the sixth aspect, since the fixing point where the connector holding member which is fixed to the case and the power control unit are fixed together is disposed near the fixing point where the case and the mount member are fixed together, the connector holding member, the power control unit and the case can be integrated together near the fixing point.

According to the seventh aspect, since the bolt fastening point where the connector holding member and the case are fastened together with the bolt is disposed between the fixing point where the power control unit and the connector holding member are fixed together and the fixing point where the case and the mount member are fixed together, the integration of the connector holding member, the power control unit and the case can be promoted.

According to the eighth aspect, in the axial direction and the direction which is at right angles to the axial direction, the lengths of the power control unit are shorter than the lengths of the case, and therefore, it is possible to avoid a risk of the power control unit, which is a high-voltage member, constituting as first hit point when the vehicle is involved in a collision.

According to the ninth aspect, since the power control unit is disposed such that the upper surface of the power control unit is inclined upwards from the front to the rear thereof so as to follow the shape of the hood which covers the engine compartment, the instilling capability of the power control emit into the engine compartment and the air bleeding capability of a coolant which flows through the power control unit can be enhanced.

According to the tenth aspect, since the water jacket of the power control unit communicates with the air bleeding tank which is provided at the rear, air in the coolant can be recovered into the tank with better efficiency by the synergy between the communication of the water jacket with the air bleeding tank and the upward inclination of the power control unit towards the rear.

According to the eleventh aspect, since the recessed portion is formed on the case so as to be adjacent to the power control unit resting portion, the drainage of water staying in the power control unit resting portion therefrom can be enhanced by guiding the water into the recessed portion. In addition, since the power control unit is rested on the power control unit resting portion with the space defined therebetween, heat interference therebetween can be prevented. Further, a bottom surface of the power control unit can be cooled by air flowing through the space.

According to the twelfth aspect, since the case-side generator connector and the case-side motor connector are disposed side by side between the center of the generator in the axial direction and the center of the motor in the axial direction along the direction which is at right angles to the axial direction, not only can the case-side generator connector and the case-side motor connector be disposed near to each other in the position lying near to either of the generator and the motor, but also the connector holding member can be made up of the single member which is used commonly for both the connectors.

According to the thirteenth aspect, not only can the generator resolver and the motor resolver be disposed by making use of the dead space defined radially inwards of the coil transition portions, but also the partition wall can be used as the support wall which is used commonly for the generator resolver and the motor resolver.

According to the fourteenth aspect, the resolver connector can be disposed with high degree of freedom by avoiding the interference with the power control unit.

According to the fifteenth aspect, the weight balance is improved by aligning the engine, the generator and the motor in the width direction. Additionally the influence of heat of the exhaust pipe can be suppressed by disposing the power control unit which needs a countermeasure against heat on the opposite side of the case to the side thereof where the exhaust pipe is provided. In addition, the influence of heat of the exhaust pipe can be suppressed further by disposing the power control unit so as to be offset from the projection zone of the exhaust pipe.

MODE FOR CARRYING OUT THE INVENTION

Hereinafter, a hybrid vehicle driving system according to an embodiment of the invention will be described based on the accompanying drawings.

Figure 1:
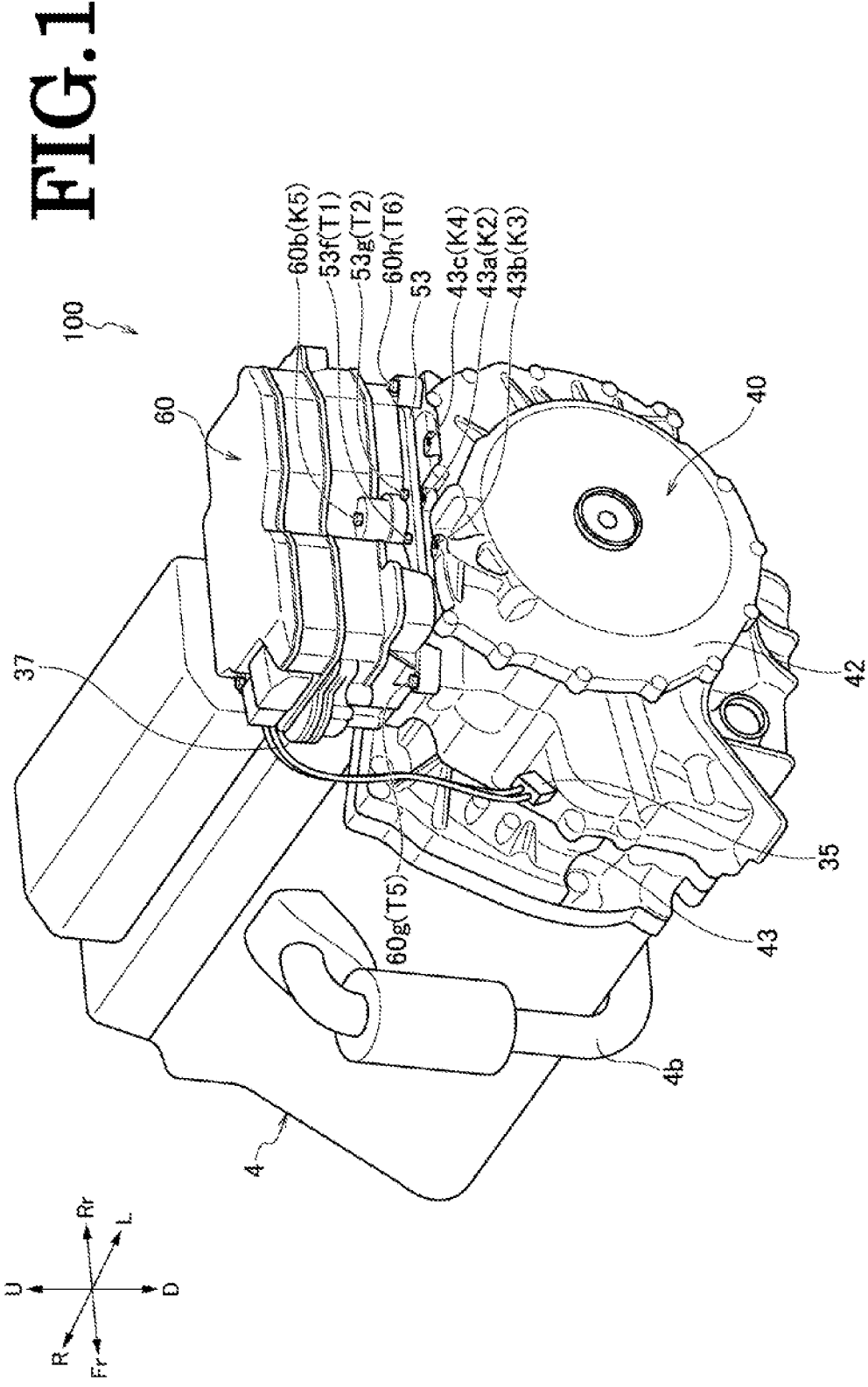
FIG. 1 is a perspective view of a hybrid vehicle driving system according to an embodiment of the invention.

As shown in FIG. 1, in a hybrid vehicle driving system 100 according to an embodiment of the invention, an engine 4 and a driving system case 40 which accommodates a generator 20 and a motor 30 are disposed adjacent to each other in an engine compartment, not shown, and a power control unit 60 which controls the generator 20 and the motor 30 is mounted on the driving system case 40.

Figure 2:
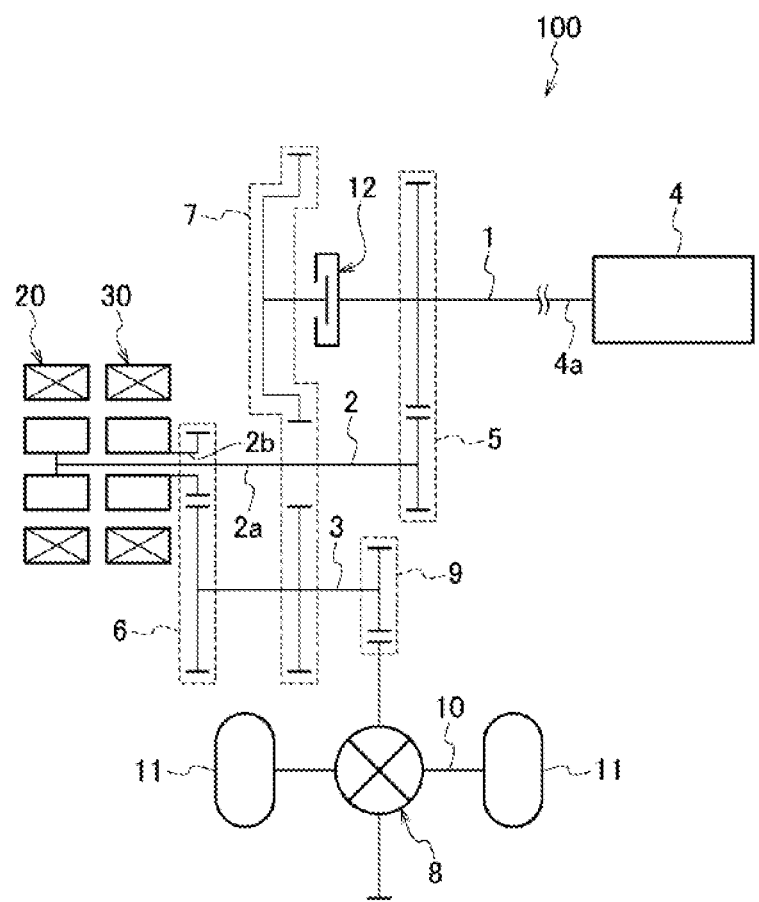
FIG. 2 is a block diagram of the hybrid vehicle driving system according to the embodiment of the invention.
Figure 3:
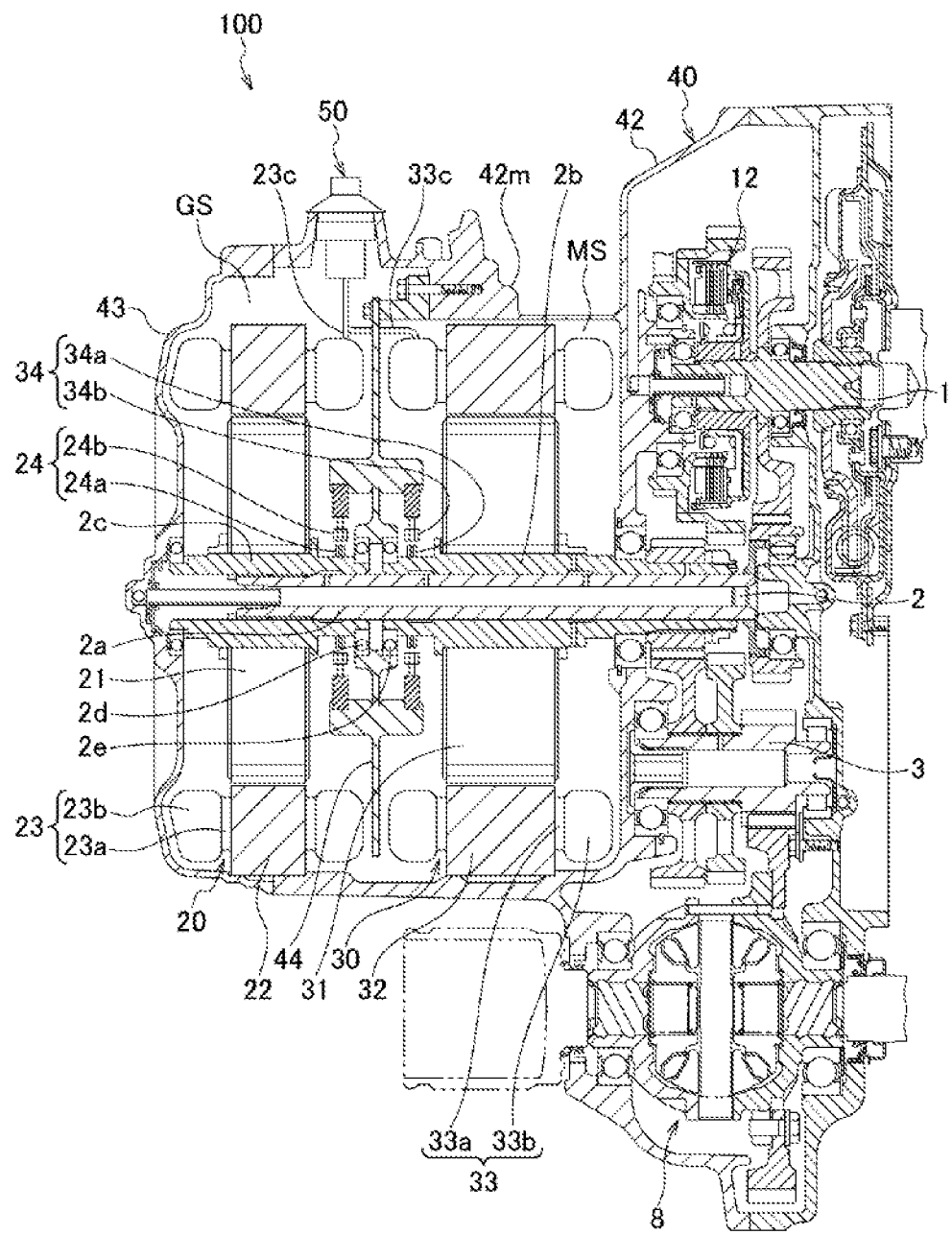
FIG. 3 is a sectional view showing an interior portion of a driving system case of the hybrid vehicle driving system according to the embodiment of the invention.

As shown in FIGS. 2 and 3, an input shaft 1, an intermediate shaft 2 and an output shaft 3, which are disposed parallel to one another, are provided in an interior of the driving system case 40. In the intermediate shaft 2, an inner circumferential shaft 2a is surrounded by an outer circumferential shaft 2b so as to rotate relatively. In the following description, an axial direction means a direction which is parallel to rotational axes of the input shaft 1, the intermediate shaft 2 and the output shaft 3. The hybrid vehicle driving system 100 is disposed inside the engine compartment so that the axial direction constitutes a width direction of a vehicle and a direction which is at right angles to the axial direction constitutes a front-rear direction of the vehicle.

Figure 12:
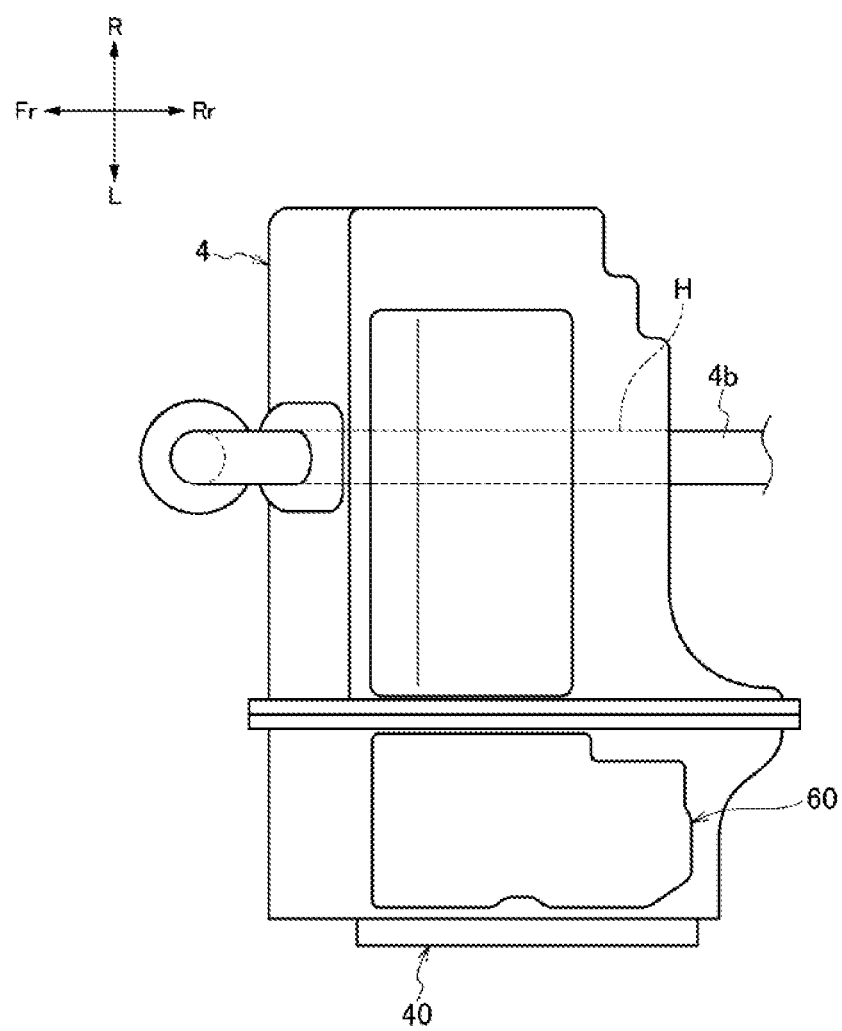
FIG. 12 is a schematic plan view of the hybrid vehicle driving system according to the embodiment of the invention.

As shown in FIGS. 1 and 12, with the hybrid vehicle driving system 100 disposed inside the engine compartment, an exhaust pipe 4b is connected to a front surface of the engine 4, and the exhaust pipe 4b extends downwards along the front surface of the engine 4 and thereafter extends rearwards along a bottom surface of the engine 4. In FIGS. 1 and 12, reference characters such as Fr, Rr, L, R, U and D denote forward, rearward, leftward, rightward, upward and downward directions, respectively, which result when a driver of the vehicle sits on a driver's seat while looking ahead of the vehicle.

The input shaft 1, which is connected to a crankshaft 4a of the engine 4, is connected to the inner circumferential shaft 2a, on an axis of which the generator 20 is provided, via a generator drive gear pair 5. The outer circumferential shaft 2b, on an axis of which the motor 30 is provided, is connected to the output shaft 3 via a motor driving force transmission gear pair 6, and the input shaft 1 and the output shaft 3 are connected together via an engine driving force transmission gear pair 7. The output shaft 3 and a differential gear unit 8 are connected together via a final gear pair 9, and the differential gear unit 8 is connected to driving wheels 11, 11 via differential shafts 10. A clutch 12 is provided on the input shaft 1, and this clutch 12 engages or disengages to effect or interrupt a power transmission between the input shaft 1 and the output shaft 3 via the engine driving force transmission gear pair 7.

The hybrid vehicle driving system 100 which is configured in the way described heretofore includes a transmission line through which a driving force of the motor 30 is transmitted to the driving wheels 11, 11 to cause the vehicle to travel and a transmission line through which a driving force of the engine 4 is transmitted to the driving wheels 11, 11 to cause the vehicle to travel, and is configured to travel by selecting one of the two transmission lines or using the two transmission lines in parallel.

When the transmission line is made use of through which the driving force of the motor 30 is transmitted to the driving wheels 11, 11 to cause the vehicle to travel, the engine 4 is driven with the clutch 12 released. An engine driving force which is inputted from the input shaft 1 into the inner circumferential shaft 2a of the intermediate shaft 2 by way of the generator drive gear pair 5 rotates the inner circumferential shaft 2a and also rotates the generator 20 which is fixed to the inner circumferential shaft 2a together with the inner circumferential shaft 2a, causing the generator 20 to generate electric power. The motor 30, which is connected on to the outer circumferential shaft 2b which surrounds the inner circumferential shaft 2a relatively rotatably, receives electric power generated by the generator 20 to rotate the outer circumferential shaft 2b and transmits its driving force to the output shaft 3 by way of the motor driving force transmission gear pair 6. The driving force transmitted to the output shaft 3 is then transmitted to the driving wheels 11, 11 by way of the final gear pair 9, the differential gear unit 8 and the differential shafts 10. This enables the vehicle to travel through series driving in which all the driving force of the engine 4 is transformed into electricity at the generator 20.

On the other hand, when the transmission line is made use of through which the driving force of the engine 4 is transmitted to the driving wheels 11, 11 to cause the vehicle to travel, the engine 4 is driven with the clutch 12 applied. The engine driving force transmitted from the input shaft 1 is then transmitted to the output shaft 3 by way of the engine driving force transmission gear pair 7 and is then transmitted to the driving wheels 11, 11 by way of the differential gear pair 9, the differential gear unit 8 and the differential shafts 10. In this situation, since the input shaft 1 and the inner circumferential shaft 2a are connected together by way of the generator drive gear pair 5 at all times, electric power is generated at the generator 20, and the motor 30 is rotated by means of the electric power generated at the generator 20, thereby making it possible to cause the vehicle to travel through parallel driving. In addition, it is possible to cause the vehicle to travel by means of the driving three of the engine 4 only by minimizing the drag loss while controlling the generator 20 and the motor 30 so as to generate zero torque.

Next, referring to FIG. 3, an arrangement of the generator 20 and the motor 30 in the driving system case 40 according to the embodiment will be described specifically.

The driving system case 40 according to this embodiment is made up of a first and second cases 42, 43 which are aligned sequentially in that order from an engine 4 side. The input shaft 1, the intermediate shaft 2 and the output shaft 3 are disposed parallel to one another in an interior thereof. As has been described above, the intermediate shaft 2 includes the inner circumferential shaft 2a and the outer circumferential shaft 2b. The motor 30 is connected to the outer circumferential shaft 2b, and the generator 20 is connected to the inner circumferential shaft 2a through a connecting shaft 2c which is splined to the inner circumferential shaft 2a.

Namely, the generator 20 and the motor 30 are accommodated inside the driving system case 40 so as to be aligned on the same axis. A generator accommodating section GS which accommodates the generator 20 and a motor accommodating section MS which accommodates the motor 30 are divided by a partition wall 44 and this partition wall 44 supports the outer circumferential shaft 2b and the connecting shaft 2c rotatably through bearings 2d, 2e.

The generator 20 is made up of a rotor 21 which is fixed to the connecting shaft 2c and a stator 22 which is disposed opposite to the rotor 21, and coils 23 for three phases (U phase, V phase, W phase) are wound around the stator 22. The coil 23 has a coil winding portion 23a which is wound around a teeth portion of the stator 22 and coil transition portions 23b by which the coil winding portion 23a is connected to adjacent coil winding portions 23a, and the coil transition portions 23b project in the axial direction from the stator 22. Due to this, a dead space is normally defined radially inwards of the coil transition portions 23b of the generator 20.

The motor 30 is made up of a rotor 31 which is fixed to the outer circumferential shaft 2b and a stator 32 which is disposed opposite to the rotor 31, and coils 33 for three phases (U phase, V phase, W phase) are wound around the stator 32. The coil 33 has a coil winding portion 33a which is wound around a teeth portion of the stator 32 and coil transition portions 33b by which the coil winding portion 33a is connected to adjacent coil winding portions 33a, and the coil transition portions 33b project in the axial direction from the stator 32. Due to this, a dead space is also normally defined radially inwards of the coil transition portions 33b of the motor 30.

A generator resolver 24 which detects a rotation angle of the generator 20 and a motor resolver 34 which detects a rotation angle of the motor 30 are disposed inwards of the coil transition portions 23b of the generator 20 and the coil transition portions 33b of the motor 30 in the radial direction where the dead spaces are normally defined and between the generator 20 and the motor 30 in the axial direction.

The generator resolver 24 includes a resolver rotor 24a which is fixed to the connecting shaft 2c and a resolver stator 24b which is disposed opposite do the resolver rotor 24a. The motor resolver 34 includes a resolver rotor 34a which is fixed to the outer circumferential shaft 2b and a resolver stator 34b which is disposed opposite to the resolver rotor 34a. Then, the resolver stators 24b, 34b of the generator resolver 24 and the motor resolver 34 are both supported on the partition wall 44, which has been described above. By adopting the configuration described above, not only can the generator resolver 24 and the motor resolver 34 be disposed by making use of the dead spaces which normally exists radially inwards of the coil transition portions 23b, 33b, but also the partition wall 44 can be used as a support wall which is used commonly to support the generator resolver 24 and the motor resolver 34. Coils (not shown) which are drawn out of the resolver stators 24b, 34b are connected to a resolver connector 35 which is disposed on a front surface of the driving system case 40, and the resolver connector 35 and the power control unit 60 are connected together by way of a wiring harness 37.

Figure 4:
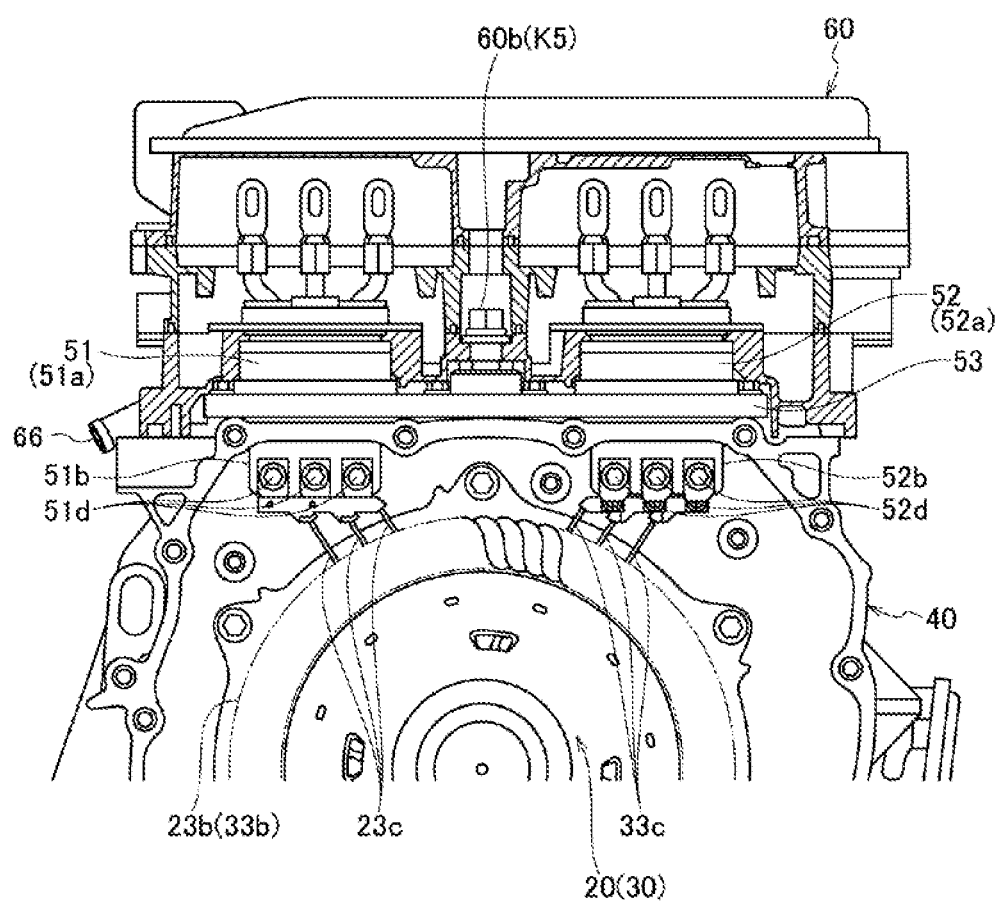
FIG. 4 is a sectional view of a main part which shows an interior of the driving system case and an interior of a power control unit of the hybrid vehicle driving system according to the embodiment of the invention.
Figure 5:
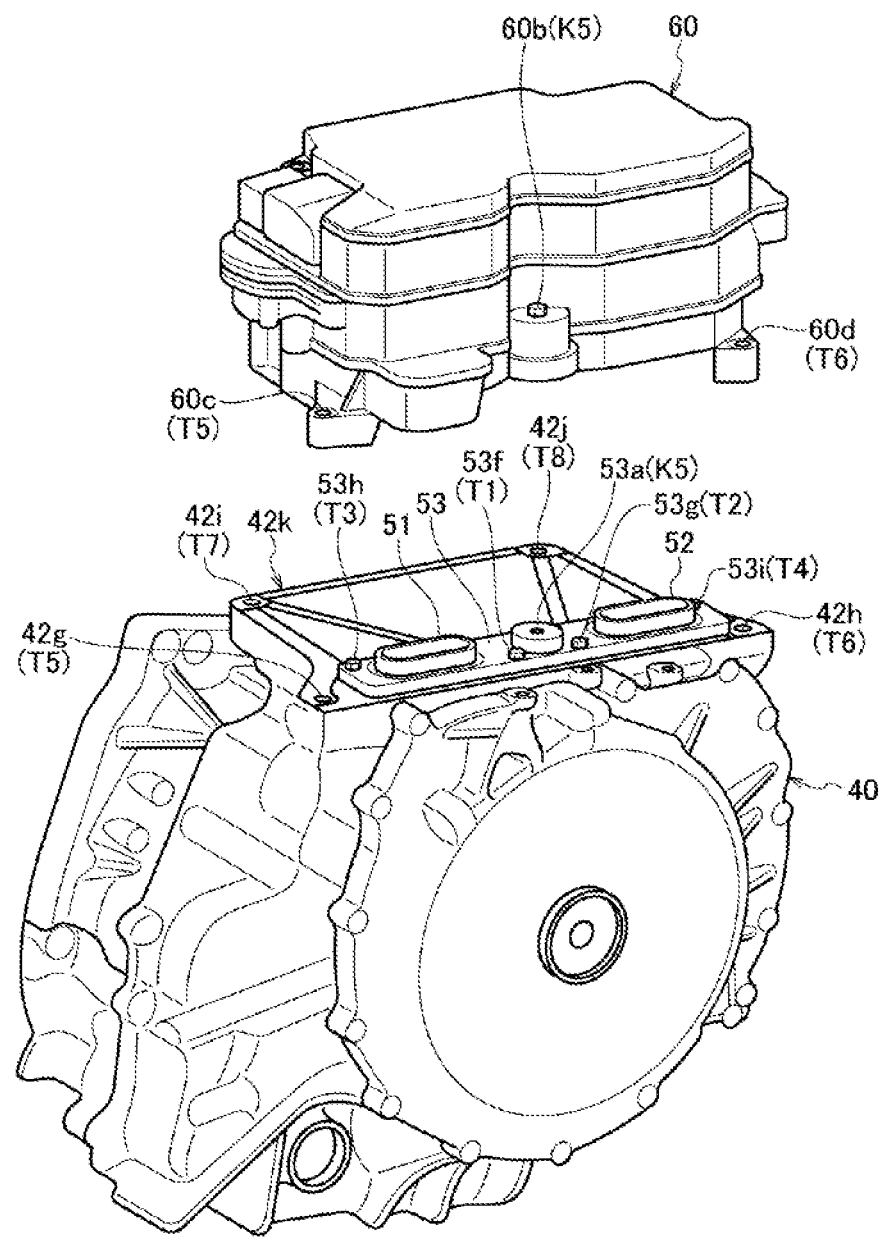
FIG. 5 is an exploded perspective view of the hybrid vehicle driving system according to the embodiment of the invention.
Figure 6A:
FIG. 6A is a side view of the power control unit.
Figure 6B:
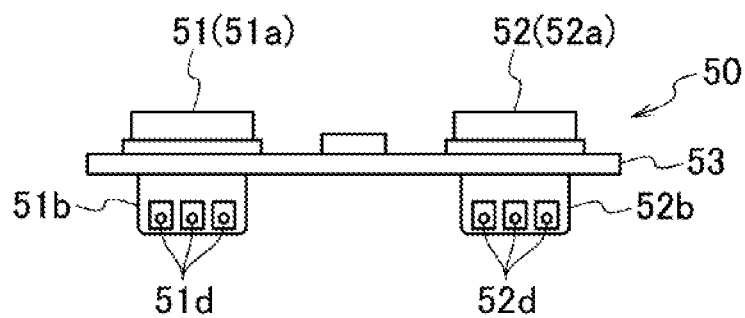
FIG. 6B shows a side view of a case-side connector.
Figure 6C:
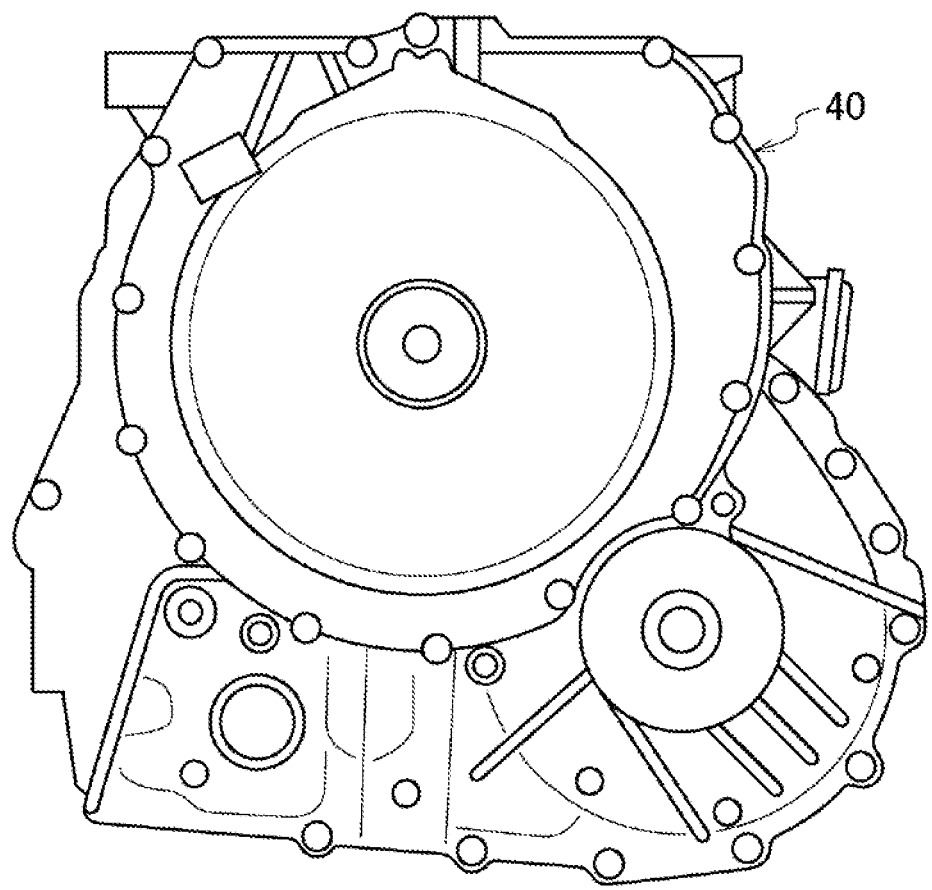
FIG. 6C is a side view of the driving system case.
Figure 7A:
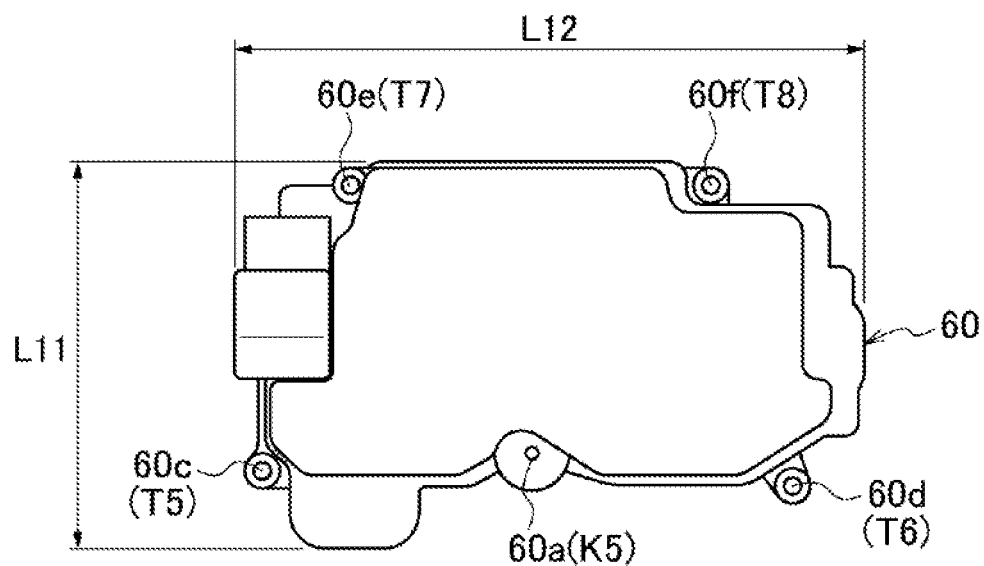
FIG. 7A is a plan view of the power control unit.
Figure 7B:
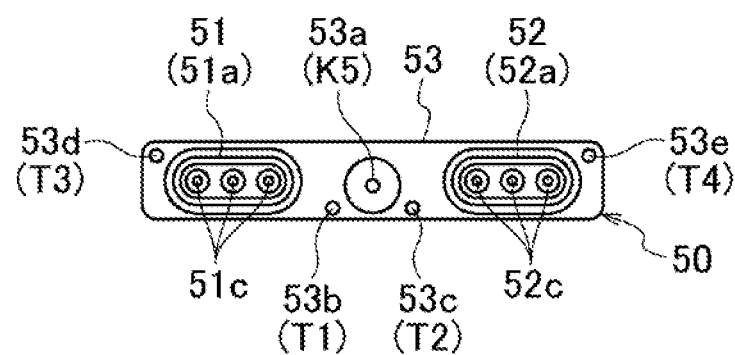
FIG. 7B shows a plan view of the case-side connector.
Figure 7C:
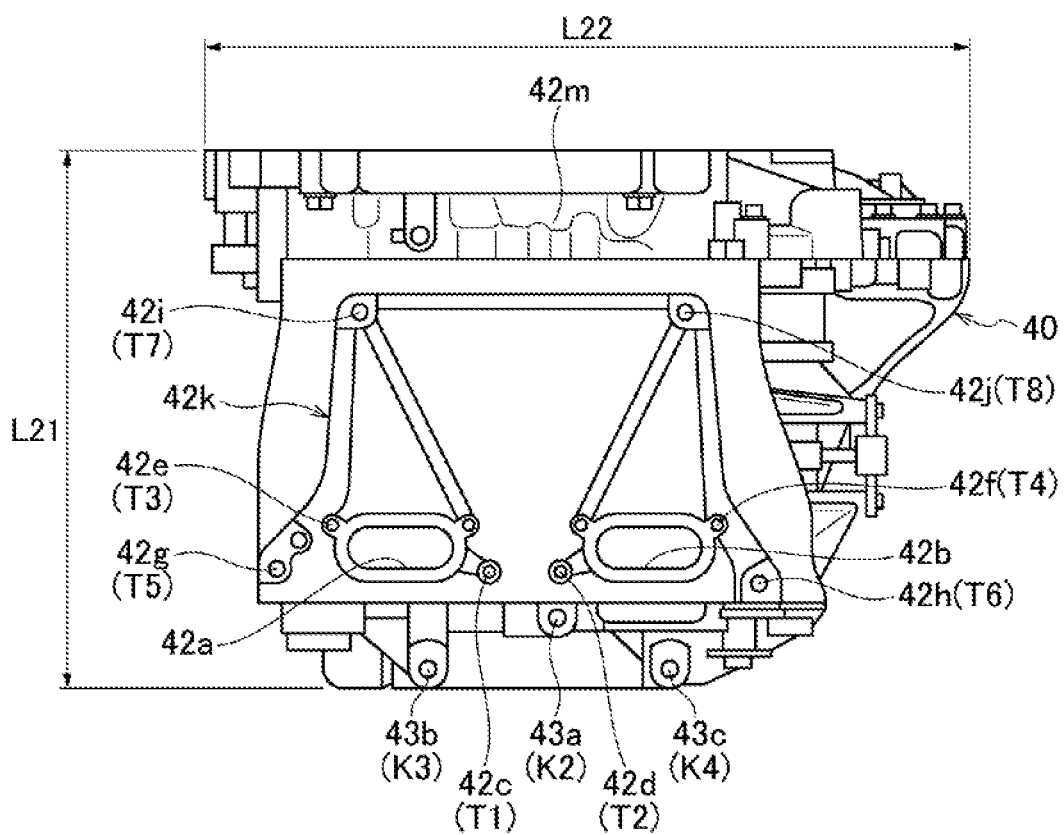
FIG. 7C is a plan view of the driving system case.

As shown in FIGS. 3 and 4, the coils 23 of three phases (U phase, V phase, W phase) of the generator 20 are connected to one another at ends thereof, and the other ends of the coils 23 are individually drawn out of the stator 22 as coil terminating ends 23c to be connected to a case-side generator connector 51 inside the driving system case 40. Additionally, the coils 33 of three phases of the motor 30 are connected to one another at ends thereof, and the other ends of the coils 33 are individually drawn out of the stator 32 as terminating ends 33c to be connected to a case-side motor connector 52 inside the driving system case 40.

The case-side generator connector 51 and the case-side motor connector 52 are disposed so as to, be aligned side by side along a direction which is at right angles to the axial direction between a center of the generator 20 in the axial direction and a center of the motor 30 in the axial direction. Then, the case-side generator connector 51 and the case-side motor generator 52 of this embodiment are connected together by way of a connector holding member 53 to thereby make up an integrated case-side connector 50 and are fixed to the driving system case 40 by way of the connector holding member 53.

To describe the case-side generator connector 51 and the case-side motor connector 52 specifically, as shown in FIGS. 4 to 7, the case-side generator connector 51 and the case-side motor connector 52 of this embodiment have connector portions 51a, 52a which project from an upper surface of the connector holding member 53 Which has a plate-like shape and coil connecting portions 51b, 52b which project from a lower surface of the connector holding member 53. The connector portions 51a, 52a have an elliptic cylindrical shape and connector terminals 51c, 52c for three phases (U phase, V phase, W phase) are disposed in the corresponding connector portions 51a, 52a. The coil connecting portions 51b, 52b have an elliptic cylindrical shape and coil connecting terminals 51d, 52d for three phases are provided on the outer surface portion of the corresponding coil connecting portions 51b, 52b, and the coil connecting terminals 51d, 52d electrically communicate with the connector terminals 51c, 52c, respectively.

The case-side generator connector 51 and the case-side motor connector 52 of the embodiment which are configured in the way described above are mounted on the driving system case 40 in such a state that the connector holding member 53 follows an upper surface of the driving system case 40 and that the coil connecting portions 51b, 52b fit in connector holes 42a, 42b which are formed on the upper surface of the driving system case 40. Then, in the driving system case 40, the coil terminals 23c of three phases of the generator 20 are connected to the coil connecting, terminals 51d of the case-side generator connector 51, and the coil terminals 33c of three phases of the motor 30 are connected to the coil connecting terminals 52d of the case-side motor connector 52 (refer to FIG. 4).

Figure 8:
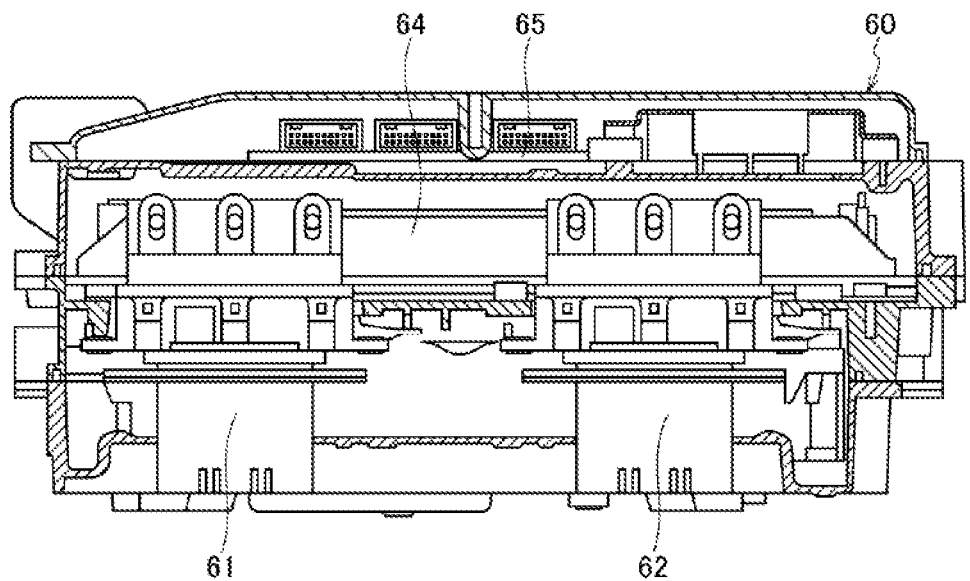
FIG. 8 is a sectional view showing the power control unit of the hybrid vehicle driving system according to the embodiment of the invention.

As shown in FIG. 8, the power control unit 60 of this embodiment includes an inverter 64, a control unit 65 (ECU) which controls the inverter 64, and a current sensor, not shown. The inverter 64 includes a generator inverter which is connected between a DC-DC converter (not shown) which is disposed outside an engine compartment and the generator 20 and which converts an alternating current voltage to a direct current voltage and a motor inverter which is connected between the DC-DC converter (not shown) and the motor 30 and which converts a direct current voltage to an alternating current voltage or an alternating current voltage to a direct current voltage.

Figure 9:
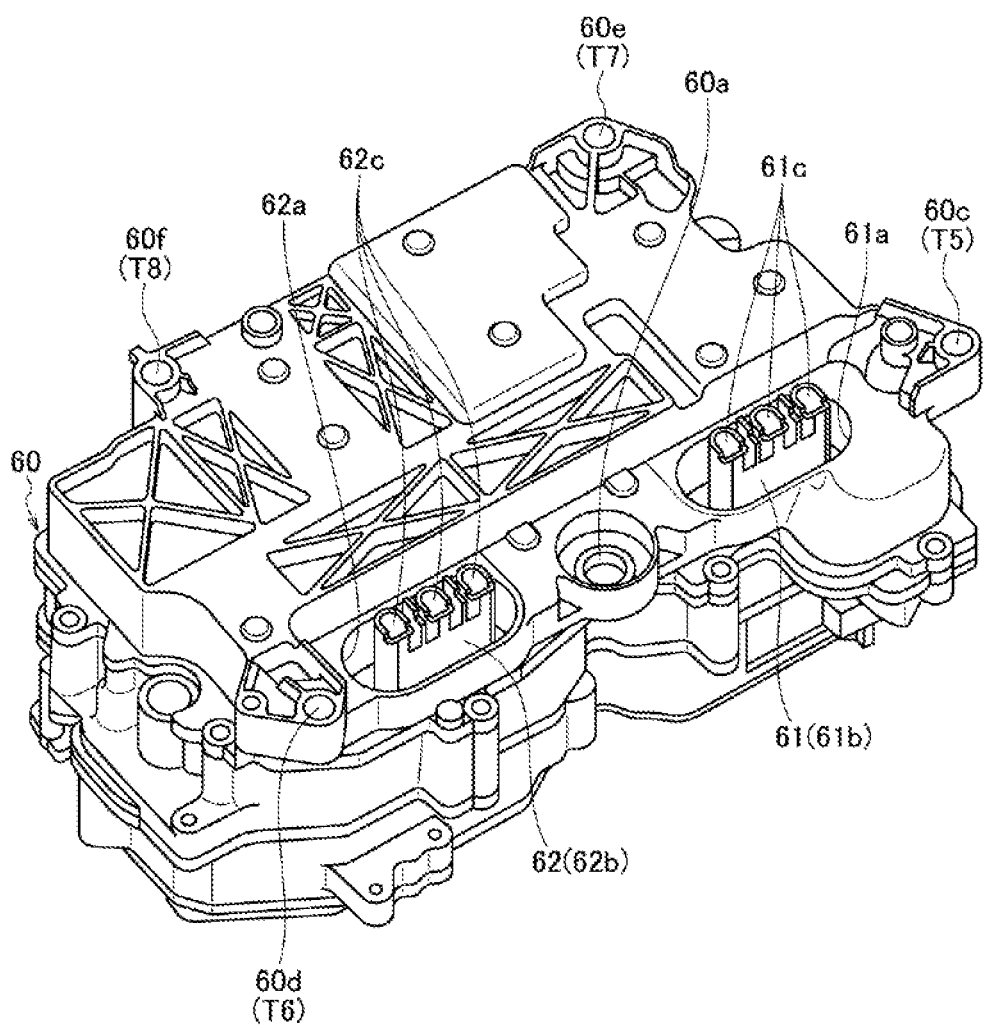
FIG. 9 is a bottom perspective view showing the power control unit of the hybrid vehicle driving system according to the embodiment of the invention.

As shown in FIGS. 4, 8 and 9, a unit-side generator connector 61 and a unit-side motor connector 62 are provided on a bottom surface of the power control unit 60, and the power control unit 60 can control the generator 20 and the motor 30 by electrically connecting the unit-side generator connector 61 and the unit-side motor connector 62 to the case-side generator connector 51 and the case-side motor connector 52, respectively.

To describe the unit-side generator connector 61 and the unit-side motor connector 62 specifically, the unit-side generator connector 61 and the unit-side motor connector 62 have elliptic fitting holes 61a, 62a which fit on the connector portions 51a, 52a of the case-side generator connector 51 and the case-side motor connector 52, connector portions 61b, 62b which are provided so as to project inside the fitting holes 61a, 62a and which fit in the connector portions 51a, 52a of the case-side generator connector 51 and the case-side motor connector 52, and connector terminals 61c, 62c which are disposed inside the connector portions 61b, 62b and which are brought into contact with the connector terminals 51c, 52c of the case-side generator connector 51 and the case-side motor connector 52 so as to electrically communicate therewith.

The power control unit 60 of this embodiment, which is configured as described above, is mounted on the driving system case 40 by connecting the unit-side generator connector 61 and the unit-side motor connector 62 which are disposed on the bottom surface of the power control unit 60 directly to the case-side generator connector 51 and the case-side motor connector 52 which are disposed on the driving system case 40.

Figure 10:
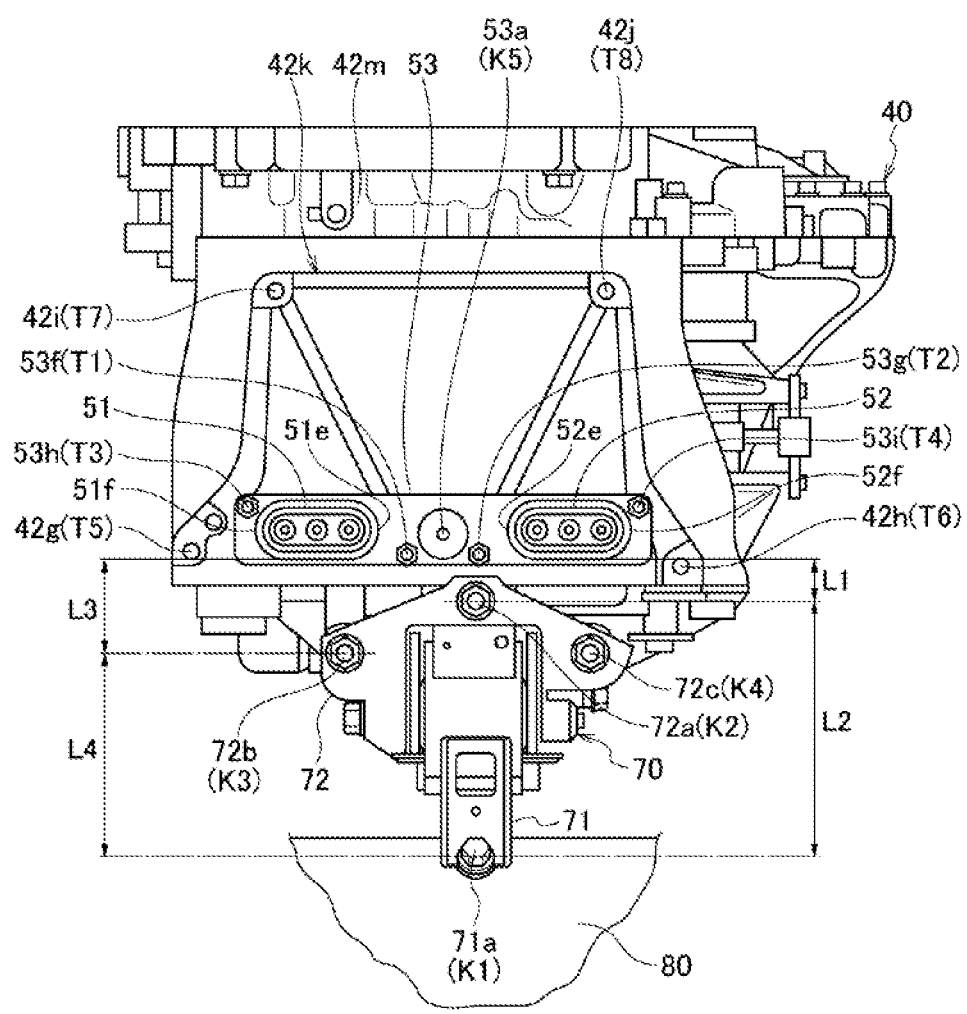
FIG. 10 is a plan view of the hybrid vehicle driving system according to the embodiment of the invention showing a state where a mount member is mounted on the driving system case.

As shown in FIG. 10, the driving system case 40 is fixed to body flame 80 by way of a mount member 70. The mount member 70 includes a vehicle-side fixing member 71 which is fixed to the body frame 80, a case-side fixing member 72 which is fixed to an outer edge side of the upper surface of the driving system case 40, and a vibration prevention member, not shown, which connects the vehicle-side fixing member 71 and the case-side fixing member 72 together. The vehicle-side fixing member 71 is fixed to the body frame 80 with a bolt 71a, and the case-side fixing member 72 are fixed to the driving system case 40 with bolts 72a, 72b, 72c. Although the driving system case 40 is also connected to the body frame 80 at another or other portions by way of a mount member or mount members 70, here, the fixing of the driving system case 40 to the body frame 80 will be described while focusing on a fixing configuration adopted near the connector holding member 53.

Specifically, a fixing point K1 (hereinafter, referred to as a body-side fixing point K1) between the mount member 70 and the body frame 80 is made up by tightening a bolt 71a into a fastening hole (not shown) which is formed in the body frame 80 by way of a through hole (not shown) which is formed through the vehicle-side fixing member 71. Then, fixing points K2, K3, K4 (hereinafter, K2 will be referred to as a first fixing point, K3 as a second fixing point, and K4 as a third fixing point.) between the mount member 70 and the driving system case 40 are made up by tightening bolts 72a, 72b, 72c into fastening holes 43a, 43b, 43c (refer to FIGS. 1, 7C) which are formed in the driving system case 40 by way of through holes (not shown) which are formed through the case-side fixing member 72.

The first fixing point K2 to the third fixing point K4 where the driving system case 40 and the mount member 70 are fixed together are disposed near the case-side generator connector 51 and the case-side motor connector 52. Specifically, a distance L1 defined from the first fixing point K2 to the case-side generator connector 51 and the case-side motor connector 52 in the axial direction is made shorter than a distance L2 defined from the first fixing point K2 to the body-side fixing point K1 where the mount member 70 and the body frame 80 are fixed together in the axial direction. Additionally, a distance L3 defined from the second fixing point K3 and the third fixing point K4 to the case-side generator connector 51 and the case-side motor connector 52 in the axial direction is made shorter than a distance L4 defined from the second fixing point K3 and the third fixing point K4 to the body-side fixing point K1 where the mount member 70 and the body frame 80 are fixed together in the axial direction.

According to the configuration described above, in mounting the power control unit 60 directly on the driving system case 40 by way of the case-side generator connector 51 and the case-side motor connector 52, since the first fixing point K2 to the third fixing point K4 where the driving system case 40 and the mount member 70 are fixed together are disposed near the case-side generator connector 51 and the case-side motor connector 52, in the case-side generator connector 51 and the case-side motor connector 52 which are situated near the first fixing point K2 to the third fixing point K4, a great vibration suppressing effect can be obtained.

In addition, when looking at the first fixing point K2 in a direction (the axial direction) which is at right angles to a direction in which the case-side generator connector 51 and the case-side motor connector 52 are aligned, it is preferable that the first fixing point K2 is situated between an inner end portion 51e of the case-side generator connector 51 and an inner end portion 52e of the case-side motor connector 52. In this way, by disposing the first fixing point K2 so as to keep a good balance against the case-side generator connector 51 and the case-side motor connector 52, it is possible to reduce further the vibration of the case-side generator connector 51 and the case-side motor connector 52.

Further, when looking at the second fixing point K3 and the third fixing point K4 in the direction (the axial direction) which is at right angles to the direction in which the case-side generator connector 51 and the case-side motor connector 52 are aligned, it is preferable that the second fixing point K3 and the third fixing point K4 are situated between an outer end portion 51f of the case-side generator connector 51 and an outer end portion 52f of the case-side motor connector 52. In this way, by disposing the three fixing points, that is, the first fixing point K2 to the third fixing point K4 so as to keep a good balance against the case-side generator connector 51 and the case-side motor connector 52, it is possible to reduce much further the vibration of the case-side generator connector 51 and the case-side motor connector 52.

Next, a fixing configuration between the power control unit 60 and the connector holding member 53, a fixing configuration between the connector holding member 53 and the driving system case 40 and a fixing configuration between the power control unit 60 and the driving system case 40 will be described.

The power control unit 60 is fixed to the connector holding member 53 which holds the case-side generator connector 51 and the case-side motor connector 52 by way of a fixing point K5. Specifically, the fixing point K5 where the power control unit 60 and the connector holding member 53 are fixed together is made up by tightening a bolt 60b into a fastening hole 53a which is formed in the connector holding member 53 by way of a through hole 60a which is formed through the power control unit 60. Then, this fixing point K5 is disposed near the first fixing point K2 where the driving system case 40 and the mount member 70 are fixed together. It is preferable that the fixing point K5 is disposed between the case-side generator connector 51 and the case-side motor connector 52. By adopting this configuration, the power control unit 60, the connector holding member 53 and the driving system case 40 can be integrated together near the first fixing point K2 where the driving system case 40 and the mount member 70 are fixed together.

The connector holding member 53 is fixed to the driving system case 40 through bolting or fastening with bolts. Specifically, bolt fastening points T1, T2, T3, T4 where the connector holding member 53 and the driving system case 40 are fastened together with bolts are made up by tightening bolts 53f, 53g, 53h, 53i into fastening holes 42c, 42d, 42e, 42f which are formed in the driving system case 40 by way of through holes 53b, 53c, 53d, 53e which are formed through the connector holding member 53. Then, in the bolt fastening points T1, T2, T3, T4, the bolt fastening points T1, T2 where a middle portion of the connector holding member 53 is fixed to the driving system case 40 are situated between the fixing point K5 where the power control unit 60 and the connector holding member 53 are fixed together and the first fixing point K2 where the driving system case 40 and the mount member 70 are fixed together when looking at them in the direction in which the case-side generator connector 51 and the case-side motor connector 52 are aligned. By adopting this configuration, the integration of the power control unit 60, the connector holding member 53 and the driving system case 40 near the fixing point K2 can be promoted.

Further, the power control unit 60 is fixed to the driving system case 40 through fastening with at least four bolts. Specifically, bolt fastening points T5, T6, T7, T8 where the power control unit 60 and the driving system case 40 are fastened together with bolts are made up by tightening bolts 60g, 60h, 60i (not shown), 60j (not shown) into fastening holes 42g, 42h, 42i, 42j which are formed in the driving system case 40 by way of through holes 60c, 60d, 60e, 60f which are formed through the power control unit 60. Boss portions of the power control unit 60 where the through holes 60c, 60d, 60e, 60f are formed are made to project slightly downwards of the bottom surface of the power control unit 60 so that only the boss portions are brought into abutment with the driving system case 40. Then, the four bolt fastening points T5, T6, T7, T8 are disposed so as to surround the case-side generator connector 51 and the case-side motor connector 52 in such a way as to form a rectangular shape therearound. By adopting this configuration, since the rigidity of the driving system case 40 is enhanced by integrating the power control unit 60 with the driving system case 40 through fastening them together with the bolts, it is possible to reduce further the vibration of the driving system case 40.

Next, a mounting posture and a cooling structure of the power control unit 60 will be described.

As shown in FIGS. 5 to 7C, a power control unit resting portion 42k is formed on an upper surface of the driving system case 40. The power control unit 60 is fixed to the driving system case 40 and the connector holding member 53 through fastening them together with the bolts in such a state that only the boss portions where the through holes 60c, 60d, 60e, 60f are formed are in abutment with the power control unit resting portion 42k and that the power control unit 60 is rested on the power control unit resting portion 42k with a space defined therebetween. The power control unit resting portion 42k of this embodiment is formed so as to project upwards from the upper surface of the driving system case 40, and in association with the projection of the power control unit resting portion 42k, a recessed portion 42m (FIGS. 3, 10), which is made lower than the power control unit resting portion 42k, is formed in a zone situated adjacent to the power control unit resting, portion 42k. By adopting this configuration, even in the event that water intrudes into an interior of the engine compartment, the water can be guided into the recessed portion 42m to thereby enhance the drainage of water. In addition, since the power control unit 60 is rested on the power control unit resting portion 42k with the space defined therebetween, heat interference therebetween can be prevented. Further, the bottom surface of the power control unit 60 can be cooled by air flowing through the space.

It is preferable that in the axial direction (the width direction) and a direction (the longitudinal direction) which is at right angles to the axial direction, lengths L11, L12 of the power control unit 60 are made shorter than lengths L21, L22 of the driving system case 40. By adopting this configuration, it is possible to avoid a risk of the power control unit 60, which is a high-voltage part, constituting a first hit point in the event that the vehicle is involved in a collision.

Additionally, it is preferable that the power control unit 60 is inclined upwards from the front towards the rear thereof so that the upper surface thereof follows a hood (not shown) which covers the engine compartment in such a state that the driving system case 40 is fixed to the body frame 80 by way of the mount member 70. By adopting this configuration, the installing capability of the power control unit 60 into the engine compartment and the air bleeding capability of a coolant which flows through an interior of the power control unit 60 can be enhanced.

Figure 11:
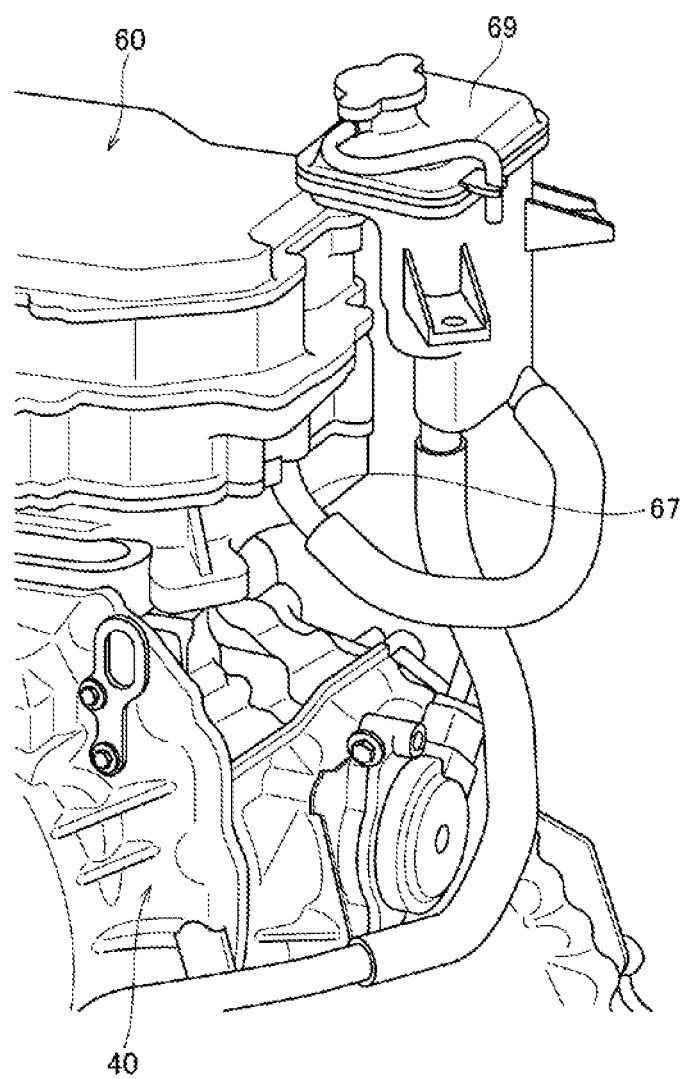
FIG. 11 is a perspective view showing an air bleeding tank mounted on the power control unit of the hybrid vehicle driving system according to the embodiment of the invention.

A water jacket (not shown) which constitutes a flow path of the coolant is formed in the interior of the power control unit 60. As shown in FIGS. 4 and 11, an inlet tube 66, which is connected to an inlet port of the water jacket, is provided at a front end side (a lower inclined side) of the power control unit 60, and an outlet tube 67, which is connected to an outlet port of the water jacket, is provided at a rear end side (an upper inclined side) of the power control unit 60. Then, by providing a coolant supply line which extends from a radiator, not shown, to reach the inlet tube 66 and a coolant return line which extends from the outlet tube 67 to reach the radiator, the coolant is supplied to the power control unit 60 at all times, whereby an electronic component inside the power control unit 60 is cooled.

Additionally, an air bleeding tank 69, which is interposed in the coolant return line, is provided at the rear (the upper inclined side) of the power control unit 60. Namely, since the water jacket of the power control unit 60 communicates with the air bleeding tank 69 at the upper inclined side, air in the coolant can be recovered into the air bleeding tank 69 with good efficiency.

Further, as shown in FIG. 12, the power control unit 60 is disposed so as to be offset in the width direction from an exhaust pipe projection zone H where the exhaust pipe 4b is projected in an up-down direction. By adopting this configuration, the power control unit 60, which needs to be provided with a countermeasure against heat, is disposed on an opposite side of the driving system case 40 to the side where the exhaust pipe 4b, which constitutes a heat source, is provided, whereby the influence of heat can be suppressed. Additionally, the influence of heat can be suppressed further by disposing the power control unit 60 so as to be offset in the width direction from the exhaust pipe projection zone H.

Thus, as has been described heretofore, the embodiment provides at least the following aspects.

(1) The hybrid elude driving system 100 including:

the generator 20 which can generate electric power using power from the engine 4;

the motor 30 which drives wheels;

the driving system case 40 which accommodates the generator 20 and the motor 30; and the power control unit 60 for controlling the generator 20 and the motor 30, the generator 20 and the motor 30 being disposed side by side on the same axis within the driving system case 40, wherein the power control unit 60 is mounted on the driving system case 40 by connecting the unit-side generator connector 61 and the unit-side motor connector 62 which are provided on the bottom surface of the power control unit 60 with the case-side generator connector 51 and the case-side motor connector 52 which are disposed on the driving system case 40, directly and respectively, wherein the driving system case 40 is fixed to the body frame 80 by way of the mount member 70, and wherein the first fixing point K2 where the driving system case 40 and the mount member 70 are fixed together is disposed near the case-side generator connector 51 and the case-side motor connector 52.

In this way, although vibrations from the power control unit 60 are transmitted to the inside of the passenger compartment by way of the driving system case 40, the mount member 70 and the body frame 80 as a result of the power control unit 60 being mounted directly on the driving system case 40 which accommodates the generator 20 and the motor 30 by way of the case-side generator connector 51 and the case-side motor connector 52, since the power control unit 60 and the driving system case 40 are integrated into the single rigid member and the power control unit 60 is disposed near the first fixing point K2 where the driving system case 40 and the mount member 70 are fixed together, the vibrations transmitted to the inside of the passenger compartment can be reduced. As a result, not only can parts inside the power control unit 60 be prevented from being damaged by vibrations, but also noise that is transmitted from the power control unit 60 to the inside of the passenger compartment can be reduced. In addition, since the first fixing point K2 where the driving system case 40 and the mount member 70 are fixed together is disposed near the case-side generator connector 51 and the case-side motor connector 52, it is possible to obtain a great vibration damping effect in the case-side generator connector 51 and the case-side motor connector 52 which lie near the fixing point K2, thereby making it possible to prevent a contact failure of the connectors that would otherwise be caused by vibration.

(2) The hybrid vehicle driving system 100 including:

the generator 20 which can generate electric power using power from the engine 4;

the motor 30 which drives wheels;

the driving system case 40 which accommodates the generator 20 and the motor 30; and the power control unit 60 for controlling the generator 20 and the motor 30, the generator 20 and the motor 30 being disposed side by side on the same axis within the driving system case 40, wherein the power control unit 60 is mounted on the driving system case 40 by connecting the unit-side generator connector 61 and the unit-side motor connector 62 which are provided on the bottom surface of the power control unit 60 with the case-side generator connector 51 and the case-side motor connector 52 which are disposed on the driving system case 40, directly and respectively, wherein the case-side generator connector 51 and the case-side motor connector 52 are disposed side by side along the direction which is at right angles to the axial direction between the center of the generator 20 in the axial direction and the center of the motor 30 in the axial direction.

In this way, since the case-side generator connector 51 and the case-side motor connector 52 are disposed side by side along the direction which is at right angles to the axial direction between the center of the generator 20 in the axial direction and the center of the motor 30 in the axial direction, not only can the case-side generator connector 51 and the case-side motor connector 52 be disposed near to each other in the position lying near to either of the generator 20 and the motor 30, but also the connector holding member can be made up of the single member which is used commonly for both the connectors.

(3) The hybrid vehicle driving system 100 including:
the engine 4;
the exhaust pipe 4b which is connected to the engine 4;
the generator 20 which can generate electric power using power of the engine 4;
the motor 30 which is driven by electric power to drive wheels;
the driving system case 40 which accommodates the generator 20 and the motor 30; and
the power control unit 60 for controlling the generator 20 and the motor 30,
the generator 20 and the motor 30 being disposed side by side on the same axis, within the driving system case 40,
wherein the engine 4 is disposed adjacent to the driving system case 40 in the width direction of the vehicle,
wherein the exhaust pipe 4b extends from the font towards the rear of the vehicle while passing underneath the engine 4,
wherein the power control unit 60 is mounted on the driving system case 40 by connecting the unit-side generator connector 61 and the unit-side motor connector 62 which are provided on the bottom surface of the power control unit 60 with the case-side generator connector 51 and the case-side motor connector 52 which are disposed on the driving system case 40, directly and respectively, and
wherein the power control unit 60 is disposed to be offset in the width direction from the projection zone H where the exhaust pipe 4b is projected in the up-down direction.

In this way, the weight balance is improved by aligning the engine 4, the motor 30 and the generator 20 in the width direction. In addition, the power control unit 60, which needs to be provided with a countermeasure against heat, is disposed on the opposite side of the driving system case 40 to the side where the exhaust pipe 4b, which constitutes a heat source, is provided, whereby the influence of heat can be suppressed. Additionally, the influence of heat can be suppressed further by disposing the power control unit 60 so as to be offset from the exhaust pipe projection zone H.

Thus, while the embodiment of the invention has been described, various alterations in design can be made thereto without departing from the spirit and scope of the invention.

For example, in the embodiment, the driving system case 40 and the mount member 70 are fixed together at the three fixing points, that is, the first fixing point K2 to the third fixing point K4. However, the driving system case 40 and the mount member 70 may be fixed together at the single point, that is, at the first fixing point K2 only, or at two fixing points, that is, at the second fixing point K3 and the third fixing point K4. Alternatively, there may be provided four or more fixing points. In addition, when there are provided a plurality of fixing points, at least one fixing point should be disposed near the case-side generator connector 51 and the case-side motor connector 52. However, all the fixing points are preferably disposed near the case-side generator connector 51 and the case-side motor connector 52.

DESCRIPTION OF REFERENCE NUMERALS AND CHARACTERS

4 Engine
4b Exhaust pipe
20 Generator
23b Coil transition portion
24 Generator resolver (Generator resolver)
24b Resolver stator (Generator resolver stator)
30 Motor
33b Coil transition portion
34 Motor resolver (Motor resolver)
34b Resolver stator (Motor resolver stator)
40 Driving system case
42k Power control unit resting portion (Power control unit resting portion)
42m Recessed portion
44 Partition wall
51 Case-side generator connector (Case-side generator connector)
51e Inner end portion (Inner end portion of case-side generator connector)
51f Outer end portion (Outer end portion of case-side generator connector)
52 Case-side motor connector (Case-side motor connector)
52e Inner end portion (Inner end portion of case-side motor connector)
52f Outer end portion (Outer end portion of case-side motor connector)
53 Connector holding member
60 Power control unit (Power control unit)
61 Unit-side generator connector (Unit-side generator connector)
62 Unit-side motor connector (Unit-side motor connector)
69 Air bleeding tank
70 Mount member
80 Body frame (Vehicle framework member)
100 Hybrid vehicle driving system
K2 First fixing point
K3 Second fixing point
K4 Third fixing point
H Exhaust pipe projection zone

The invention claimed is:

1. A hybrid vehicle driving system comprising:
a generator which can generate electric power using power of an engine;
a motor which is driven by electric power to drive wheels;
a case which accommodates the generator and the motor; and
a power control unit for controlling the generator and the motor,
the generator and the motor being disposed side by side on a same axis within the case,
wherein the power control unit is mounted on the case by connecting a unit-side generator connector and a unit-side motor connector which are provided on a bottom surface of the power control unit with a case-side generator connector and a case-side motor connector which are disposed on the case, directly and respectively, wherein the case is fixed to a vehicle framework member via a mount member, and wherein a fixing point where the case and the mount member are fixed together, and a body-side fixing point where the mount member and the vehicle framework member are fixed together are disposed between the case-side generator connector and the case-side motor connector in a direction in which the case-side generator connector and the case-side motor connector are aligned, when looking at the fixing point and the body-side fixing point from an up-down direction.

2. The hybrid vehicle driving system according to claim 1, wherein the case-side generator connector and the case-side motor connector are fixed to the case by a connector holding member, wherein the power control unit is fixed to the connector holding member, and wherein a fixing point where the power control unit and the connector holding member are fixed together is disposed near the fixing point where the case and the mount member are fixed together.

3. The hybrid vehicle driving system according to claim 2, wherein the connector holding member and the case are fastened together with a bolt, and wherein when looking at a bolt fastening point where the connector holding member and the case are fastened together with the bolt from a direction in which the case-side generator connector and the case-side motor connector are aligned, the bolt fastening point is situated between the fixing point where the power control unit and the connector holding member are fixed together and the fixing point where the case and the mount member are fixed together.

4. The hybrid vehicle driving system according to claim 1, wherein the generator and the motor which are disposed side by side in the case are disposed within an engine compartment together with the engine, and wherein in a state where the case is fixed to the vehicle framework member via the mount member, the power control unit is disposed such that an upper surface of the power control unit is inclined upwards from a front towards a rear thereof so as to follow a shape of a hood which covers the engine compartment.

5. The hybrid vehicle driving system according to claim 4, wherein the power control unit has a water jacket, and wherein the water jacket communicates with an air bleeding tank which is provided in vicinity of the power control unit.

6. The hybrid vehicle driving system according to claim 1, wherein the engine has an exhaust pipe which is connected to the engine, wherein the engine is disposed adjacent to the case in a width direction of a vehicle, wherein the exhaust pipe extends from a front towards a rear of the vehicle while passing underneath the engine, and wherein the power control unit is disposed so as to be offset in the width direction from a projection zone where the exhaust pipe is projected in an up-down direction.

7. The hybrid vehicle driving system according to claim 1, wherein a distance from the fixing point to the case-side generator connector and the case-side motor connector is shorter than a distance from the fixing point to a body-side fixing point where the mount member and the vehicle framework member are fixed together.

8. The hybrid vehicle driving system according to claim 1, wherein in an axial direction and a direction which is at right angles to the axial direction, lengths of the power control unit are shorter than lengths of the case.

9. The hybrid vehicle driving system according to claim 1, wherein when looking at the fixing point from a direction which is at right angles to a direction in which the case-side generator connector and the case-side motor connector are aligned, the fixing point is situated between an inner end portion of the case-side generator connector and an inner end portion of the case-side motor connector.

10. The hybrid vehicle driving system according to claim 1, wherein the fixing point includes a first fixing point which is situated between an inner end portion of the case-side generator connector and an inner end portion of the case-side motor connector, and further a second fixing point and a third fixing point which differ from the first fixing point, and wherein when looking at the second fixing point and the third fixing point from a direction which is at right angles to a direction in which the case-side generator connector and the case-side motor connector are aligned, the second fixing point and the third fixing point are situated between an outer end portion of the case-side generator connector and an outer end portion of the case-side motor connector.

11. The hybrid vehicle according to claim 1, wherein the power control unit is rested on a power control unit resting portion which is provided on an upper surface of the case with a space defined between the power control unit and the power control unit resting portion, and wherein a recessed portion is formed on the case so as to be adjacent to the power control unit resting portion.

12. The hybrid vehicle driving system according to claim 1, wherein the power control unit and the case are fastened together with bolts, and wherein at least four bolt fastening points where the power control unit and the case are fastened together are provided so as to surround the case-side generator connector and the case-side motor connector in such a way as to form a rectangular shape therearound.

13. A hybrid vehicle driving system comprising:

a generator which can generate electric power using power of an engine;

a motor which is driven by electric power to drive wheels;

a case which accommodates the generator and the motor; and a power control unit for controlling the generator and the motor, the generator and the motor being disposed side by side on a same axis within the case, wherein the power control unit is mounted on the case by connecting a unit-side generator connector and a unit-side motor connector which are provided on a bottom surface of the power control unit with a case-side generator connector and a case-side motor connector which are disposed on the case, directly and respectively, wherein the case-side generator connector and the case-side motor connector are disposed between a center of the generator and a center of the motor in an axial direction of the generator, and wherein the case-side generator connector and the case-side motor connector are disposed side by side along a direction which is at right angles to the axial direction, the case-side generator connector and the case-side motor connector are fixed to the case by a single connector holding member.

14. The hybrid vehicle driving system according to claim 13, wherein a generator resolver and a motor resolver are provided inwards of a coil transition portion of the generator and a coil transition portion of the motor in a radial direction and between the generator and the motor in the axial direction, and wherein a generator resolver stator which makes up the generator resolver and a motor resolver stator which makes up the motor resolver are supported on a partition wall which divides an inside of the case into a generator accommodating portion and a motor accommodating portion.

15. The hybrid vehicle driving system according to claim 13, wherein a generator resolver and a motor resolver are provided inwards of a coil transition portion of the generator and a coil transition portion of the motor in a radial direction and between the generator and the motor in the axial direction, wherein a resolver connector is provided on the case, and wherein the resolver connector is provided on a surface of the case which differs from a surface thereof where the case-side generator connector and the case-side motor connector are provided.

\* \* \* \* \*